(12) United States Patent
Hu et al.

(10) Patent No.: US 11,916,884 B2
(45) Date of Patent: Feb. 27, 2024

(54) VEHICLE AND VEHICLE SECURITY CONTROL METHOD AND SYSTEM BASED ON OPEN PLATFORM

(71) Applicant: BYD COMPANY LIMITED, Shenzhen (CN)

(72) Inventors: Chaolin Hu, Shenzhen (CN); Hong Yao, Shenzhen (CN); Lihua Wu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 765 days.

(21) Appl. No.: 17/048,922

(22) PCT Filed: Apr. 18, 2019

(86) PCT No.: PCT/CN2019/083196
§ 371 (c)(1),
(2) Date: Oct. 19, 2020

(87) PCT Pub. No.: WO2019/201294
PCT Pub. Date: Oct. 24, 2019

(65) Prior Publication Data
US 2021/0176209 A1 Jun. 10, 2021

(30) Foreign Application Priority Data
Apr. 20, 2018 (CN) .......................... 201810360828.6

(51) Int. Cl.
*H04L 9/40* (2022.01)
*G06F 8/76* (2018.01)
(Continued)

(52) U.S. Cl.
CPC .............. *H04L 63/029* (2013.01); *G06F 8/76* (2013.01); *G06F 9/547* (2013.01); *B60R 16/0231* (2013.01)

(58) Field of Classification Search
USPC .......... 726/12, 2, 21, 36; 713/150, 163, 181; 380/255, 264, 276
See application file for complete search history.

(56) References Cited

U.S. PATENT DOCUMENTS

| 8,522,028 B2 * | 8/2013 | Brique .................... G06F 21/72 |
| | | 713/168 |
| 11,080,387 B1 * | 8/2021 | Lattin ..................... G06F 21/44 |

(Continued)

FOREIGN PATENT DOCUMENTS

| CN | 1715629 A | 1/2006 |
| CN | 101213577 A | 7/2008 |

(Continued)

OTHER PUBLICATIONS

The World Intellectual Property Organization (WIPO) International Search Report for PCT/CN2019/083196 dated Jul. 23, 2019 6 Pages.

*Primary Examiner* — Sharif E Ullah
(74) *Attorney, Agent, or Firm* — Wenye Tan

(57) ABSTRACT

The present disclosure discloses a vehicle and a vehicle security control method and system based on an open platform. The open platform includes a software development kit in which a control protocol is encapsulated, the software development kit provides an API function interface, and the method includes: receiving a call request from a third-party device for a target API function interface of the open platform; converting the call request by using the software development kit to generate a control signal that meets a requirement of the control protocol and that is used for controlling a first vehicle component in a vehicle; and transmitting the control signal to a security gateway through a first bus, to enable the security gateway to perform protocol conversion on the control signal, and transmitting (Continued)

the control signal to an in-vehicle network to control the first vehicle component in the vehicle.

14 Claims, 3 Drawing Sheets

(51) Int. Cl.
 *G06F 9/54* (2006.01)
 *B60R 16/023* (2006.01)

(56) References Cited

U.S. PATENT DOCUMENTS

| | | | | |
|---|---|---|---|---|
| 2010/0191967 | A1* | 7/2010 | Fujii | H04L 63/0861 |
| | | | | 713/169 |
| 2011/0231034 | A1* | 9/2011 | Kinser | B60K 6/46 |
| | | | | 701/2 |
| 2013/0193920 | A1* | 8/2013 | Dickerhoof | B60L 53/00 |
| | | | | 320/109 |
| 2013/0326045 | A1* | 12/2013 | Wang | H04L 41/0226 |
| | | | | 709/223 |
| 2015/0350167 | A1* | 12/2015 | Djakovic | H04L 61/5092 |
| | | | | 713/163 |
| 2017/0310674 | A1* | 10/2017 | Markham | H04L 9/3247 |
| 2019/0007215 | A1* | 1/2019 | Hakuta | H04W 12/069 |
| 2021/0119800 | A1* | 4/2021 | Jung | H04L 9/3242 |
| 2021/0209494 | A1* | 7/2021 | Mukherjee | G06N 5/043 |
| 2021/0211271 | A1* | 7/2021 | Kuang | H04L 9/065 |
| 2021/0250174 | A1* | 8/2021 | Cheng | H04L 9/0869 |
| 2021/0281408 | A1* | 9/2021 | Liu | G06F 21/60 |
| 2022/0123923 | A1* | 4/2022 | Patne | H04L 9/0866 |

FOREIGN PATENT DOCUMENTS

| | | |
|---|---|---|
| CN | 101318489 A | 12/2008 |
| CN | 101801739 A | 8/2010 |
| CN | 102171993 A | 8/2011 |
| CN | 102291334 A | 12/2011 |
| CN | 202257264 U | 5/2012 |
| CN | 102834287 A | 12/2012 |
| CN | 103973763 A | 8/2014 |
| CN | 104199657 A | 12/2014 |
| CN | 104657300 A | 5/2015 |
| CN | 104943555 A | 9/2015 |
| CN | 105960347 A | 9/2016 |
| CN | 106953796 A | 7/2017 |
| EP | 3148236 A1 | 3/2017 |
| KR | 20130043535 A | 4/2013 |
| WO | 2015000872 A1 | 1/2015 |

* cited by examiner

VEHICLE AND VEHICLE SECURITY CONTROL METHOD AND SYSTEM BASED ON OPEN PLATFORM

CROSS-REFERENCE TO RELATED APPLICATIONS

This application is a national phase entry under 35 U.S.C. § 371 of International Application No. PCT/CN2019/083196, filed on Apr. 18, 2019, which claims priority to Chinese Patent Application No. 201810360828.6, filed by BYD Co., Ltd. on Apr. 20, 2018, and entitled "VEHICLE AND VEHICLE SECURITY CONTROL METHOD AND SYSTEM BASED ON OPEN PLATFORM", content of all of which is incorporated herein by reference in its entirety.

FIELD

This application relates to the field of vehicles and, in particular, to a vehicle and a vehicle security control method and system based on an open platform.

BACKGROUND

With the development of intelligent driving and continuous development of Internet technologies in vehicles, a vehicle open platform has formed a development trend. How to open a control protocol of a vehicle to an outside developer for joint development without divulging vehicle protocol information of the company is a difficult problem to the open platform.

In the related art, vehicle components transmits CAN message data to a security gateway through a CAN bus, then, a protocol is converted through the security gateway, and the converted protocol is provided for outside developers to implement their own development control. However, the existing problem in the related art is that ensuring information security only by converting a protocol through a security gateway is likely to be cracked by an outside developer, resulting in a large information security risk, and the protocol converted through the security gateway is not conducive to joint development.

SUMMARY

The present disclosure is intended to resolve at least one of technical problems in the related art to some extent. Therefore, an aspect of the present disclosure provides a vehicle security control method based on an open platform, where a control protocol can be converted by using a software development kit, to further keep a control protocol of a vehicle confidential.

Another aspect of the present disclosure provides a vehicle security control system based on an open platform.

Still another aspect of the present disclosure provides a vehicle.

To achieve the above objective, the first aspect of the present disclosure provides a vehicle security control method based on an open platform. The open platform includes a software development kit in which a control protocol is encapsulated, the software development kit provides an API function interface, and the security control method includes the following steps: receiving a call request from a third-party device for a target API function interface of the open platform; converting the call request by using the software development kit to generate a control signal that meets a requirement of the control protocol and that is used for controlling a first vehicle component in a vehicle; and transmitting the control signal to a security gateway through a first bus, to enable the security gateway to perform protocol conversion on the control signal, and transmitting the control signal to an in-vehicle network to control the first vehicle component in the vehicle.

According to the vehicle security control method based on an open platform provided in the present disclosure, a call request is first received from a third-party device for a target API function interface of the open platform, then, the call request is converted by using the software development kit to generate a control signal that meets a requirement of the control protocol and that is used for controlling a first component in a vehicle, and further, the control signal is transmitted to a security gateway through a first bus, to enable the security gateway to perform protocol conversion on the control signal, and is transmitted to an in-vehicle network to control the first vehicle component in the vehicle. Therefore, in the control method in the present disclosure, a control protocol can be converted by using a software development kit, to further keep a control protocol of a vehicle confidential and improve security performance of the control protocol of the vehicle. In addition, the software development kit can further provide an API function interface, to help an outside developer perform joint development.

The converting the call request by using the software development kit to generate a control signal that meets a requirement of the control protocol and that is used for controlling a vehicle includes: obtaining a parameter value corresponding to the target API function interface from the call request; and converting, according to the parameter value corresponding to the target API function interface, the parameter value by using the software development kit to generate the control signal conforming to the control protocol.

The obtaining a parameter value corresponding to the target API function interface from the call request includes: verifying, according to device information of the third-party device in the call request, whether the third-party device has a call permission; and allowing, if the third-party device has the call permission, the third-party device to obtain the parameter value corresponding to the target API function interface from the call request.

Before the receiving a call request from a third-party device for a target API function interface of the open platform, the method further includes: extracting, from the call request, interface identifier information of the target API function interface that needs to be called; and identifying the target API function interface from all API function interfaces of the open platform according to the interface identifier information.

After the transmitting the control signal to a security gateway through a first bus, the method further includes: receiving, by further using the open platform, vehicle state information transmitted by the security gateway, where the vehicle state information is obtained and sent by the vehicle to the security gateway after the first vehicle component executes the control signal; converting the vehicle state information to the parameter value corresponding to the target API function interface by using the software development kit; and transmitting the parameter value of the target API function to the third-party device through the target API function interface.

The converting the vehicle state information to the parameter value corresponding to the target API function interface by using the software development kit includes: identifying the first vehicle component to which the vehicle state information belongs; and identifying the target API function interface from all the API function interfaces of the open platform according to the identified first vehicle component, and converting the vehicle state information to the parameter value corresponding to the target API function interface by using the software development kit.

Before the converting the vehicle state information to the parameter value corresponding to the target API function interface by using the software development kit, the method further includes: comparing the identified first vehicle component with the first vehicle component in the control signal, and comparing the vehicle state information of the identified first vehicle component with the vehicle state information of the first vehicle component in the control signal, where the vehicle state information of the first vehicle component in the control signal represents a to-be-reached state after the first vehicle is controlled by using the control signal; and transmitting a prompt message to the third-party device if either the two first vehicle components or the two pieces of vehicle state information are inconsistent, where the prompt message includes the vehicle state information of the identified first vehicle component.

Before the receiving a call request from a third-party device for a target API function interface of the open platform, the method further includes: receiving the vehicle state information of the first vehicle component transmitted by the vehicle, and transmitting the vehicle state information of the first vehicle component to the third-party device through the target API function interface after converting the vehicle state information of the first vehicle component by using the software development kit.

To achieve the above objective, the another aspect of the present disclosure provides a vehicle security control system based on an open platform. The open platform includes a software development kit in which a control protocol is encapsulated, the software development kit provides an API interface, and the system includes: a receiving unit, configured to receive a call request from a third-party device for a target API function interface of the open platform; a conversion unit, configured to convert the call request by using the software development kit to generate a control signal that meets a requirement of the control protocol and that is used for controlling a first vehicle component in a vehicle; and a transmission unit, configured to transmit the control signal to a security gateway through a first bus.

According to the vehicle security control system based on an open platform provided in the present disclosure, a receiving unit receives a call request from a third-party device for a target API function interface of the open platform, a conversion unit converts the call request by using the software development kit to generate a control signal that meets a requirement of the control protocol and that is used for controlling a first vehicle component in a vehicle, and a transmission unit transmits the control signal to a security gateway through a first bus. Therefore, the control system in the present disclosure can convert a control protocol by using a software development kit, to further keep a control protocol of a vehicle confidential and improve security performance of the control protocol of the vehicle. In addition, the software development kit can further provide an API function interface, to help an outside developer perform joint development.

To achieve the above objective, the still another aspect of the present disclosure provides a vehicle including the vehicle security system based on an open platform.

According to the vehicle provided in the present disclosure, the vehicle security system based on an open platform can further keep a control protocol of a vehicle confidential and improve security performance of the control protocol of the vehicle. In addition, the software development kit can further provide an API function interface, to help an outside developer perform joint development.

DETAILED DESCRIPTION

The following describes embodiments of the present disclosure in detail. Examples of the embodiments are shown in the accompanying drawings, and same or similar reference signs in all the accompanying drawings indicate same or similar components or components having same or similar functions. The embodiments described below with reference to the accompanying drawings are exemplary, and are intended to explain the present disclosure and cannot be construed as a limitation to the present disclosure.

Figure 2:
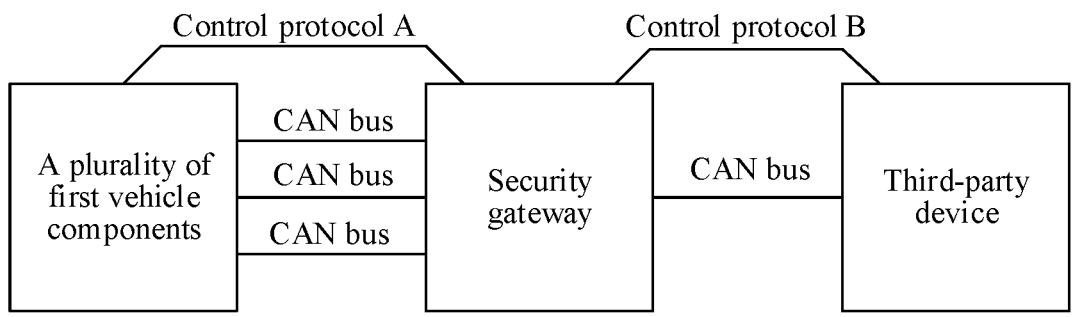
FIG. 2 is a schematic structural diagram of a vehicle security control system based on an open platform in the related art.

FIG. 2 is a schematic structural diagram of a vehicle security control system based on an open platform in the related art. As shown in FIG. 2, an in-vehicle network may include a plurality of vehicle components. The plurality of vehicle components separately transmit state information conforming to a control protocol A to a security gateway through a CAN bus. The security gateway performs encryption conversion on the state information conforming to the control protocol A to generate a new CAN protocol, for example, a control protocol B, that is, the control protocol B is the control protocol A after the encryption conversion. The security gateway further transmits state information conforming to the control protocol B to a third-party device through the CAN bus. Conversely, the third-party device may transmit a control signal conforming to the control protocol B to the security gateway. The security gateway performs decryption conversion on the control signal conforming to the control protocol B to obtain a control signal conforming to the control protocol A, and transmits the control signal conforming to the control protocol A to the plurality of vehicle components to control the plurality of vehicle components. Therefore, encryption conversion is performed on the control protocol A by only using the security gateway. Once the control protocol A is directly transmitted to the third-party device without being subjected to the encryption conversion performed by the security gateway, or the control protocol B is cracked by an outside developer, a vehicle is in a severe security risk.

Based on this, the present disclosure provides a vehicle security control method based on an open platform.

A vehicle security control method based on an open platform, a vehicle security control system based on an open platform, and a vehicle provided in the present disclosure are described below with reference to the accompanying drawings.

Figure 1:
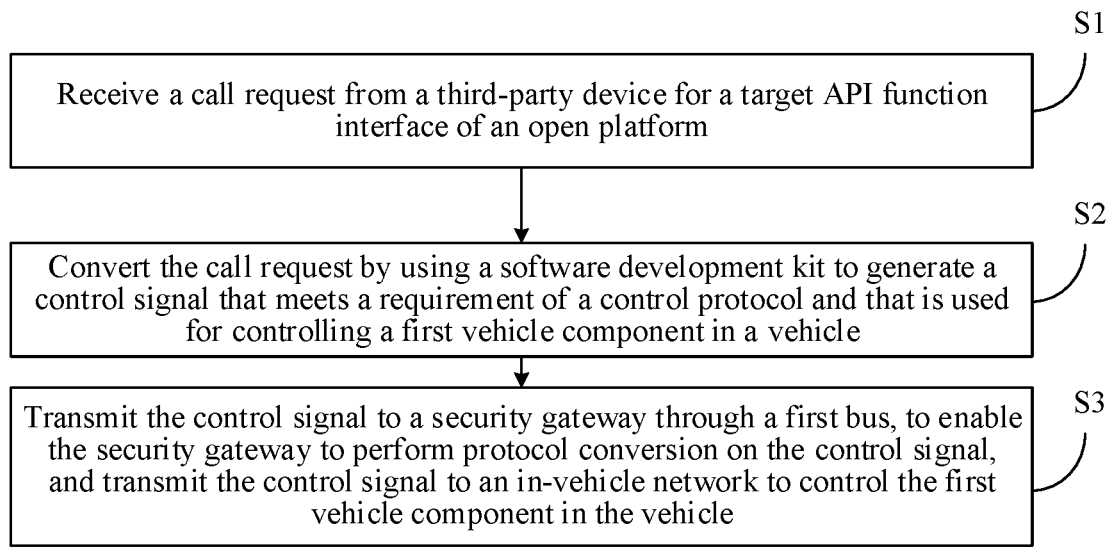
FIG. 1 is a flowchart of a vehicle security control method based on an open platform according to the present disclosure.

FIG. 1 is a flowchart of a vehicle security control method based on an open platform according to the present disclosure. The open platform includes a software development kit (SDK) in which a control protocol is encapsulated, and the software development kit provides an API (Application Programming Interface) function interface.

It should be noted that, the software development kit SDK is a set of development tools used by a software engineer for creating application software for a specified software package, a specified software framework, a specified hardware platform, a specified operating system, and the like. That is, in the present disclosure, an API function interface may be provided by using a software development kit of any one of the software package, the software framework, the hardware platform, and the operating system.

As shown in FIG. 1, the vehicle security control method based on an open platform in the present disclosure includes the following steps.

S1: Receive a call request from a third-party device for a target API function interface of the open platform.

It should be noted that, after a protocol control program is converted by using the software development kit SDK, an API function interface may be provided. The API function interface represents each controllable component in a vehicle in a form of a parameter. An outside developer (a third party) may transmit the call request to the open platform by using the third-party device in a manner of parameter assignment. The call request includes a to-be-assigned target API function interface and an assigned value of the target API function interface.

It should be understood that, in the present disclosure, the control protocol is encapsulated into the software development kit SDK, and it is further needed to provide related documentation of the API function interface and related use routines of the software development kit SDK for the outside developer. The API function interface is defined in accordance with an API function interface standard opened by the company, and a function of the API function interface may be implemented by using an interface specification of the Android or Linux system.

For example, when the outside developer wants to issue an order of controlling a left-turn signal lamp, a call request in which i=1 may be transmitted to the open platform, where i is an API function interface identifier of the left-turn signal lamp, 1 represents on, and 0 represents off.

S2: Convert the call request by using the software development kit to generate a control signal that meets a requirement of the control protocol and that is used for controlling a first vehicle component in a vehicle.

The converting the call request by using the software development kit to generate the control signal that meets a requirement of the control protocol and that is used for controlling the vehicle includes:

obtaining a parameter value corresponding to the target API function interface from the call request; and allowing, if the third-party device has the call permission, the third-party device to obtain the parameter value corresponding to the target API function interface from the call request.

The obtaining a parameter value corresponding to the target API function interface from the call request includes: verifying, according to device information of the third-party device in the call request, whether the third-party device has a call permission.

That is, when the call request transmitted by the third-party device is received, the device information of the third-party device needs to be obtained from the call request, and then, whether the third-party device has the call permission is verified. If the third-party device has the call permission, it is allowed to obtain the parameter corresponding to the target API function interface from the call request, to control the first vehicle component. If the third-party device does not have the call permission, it is not allowed to obtain the parameter corresponding to the target API function interface from the call request.

Therefore, according to the present disclosure, the outside developer may be managed, to only allow the third-party device with a partnership to control the vehicle.

After the parameter value corresponding to the target API function interface is obtained, the parameter value is converted, according to the parameter value corresponding to the target API function interface, by using the software development kit to generate the control signal conforming to the control protocol.

That is, the software development kit SDK can crack the call request transmitted by the third-party device, that is, convert the parameter value corresponding to the target API function interface to the control signal conforming to the control protocol. The control protocol is the control protocol B in the present disclosure, that is, a control protocol encrypted by a security gateway.

S3: Transmit the control signal to a security gateway through a first bus, to enable the security gateway to perform protocol conversion on the control signal, and transmit the control signal to an in-vehicle network to control the first vehicle component in the vehicle.

Figure 3:
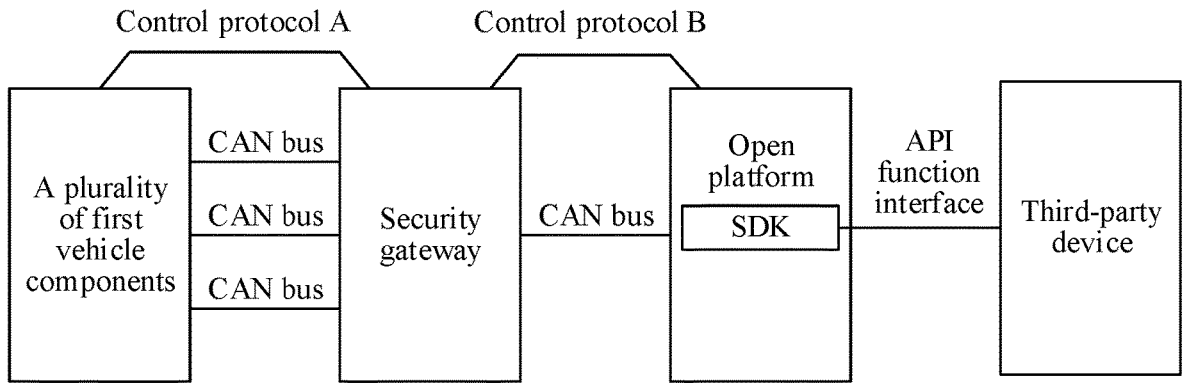
FIG. 3 is a schematic structural diagram of a vehicle security control system based on an open platform according to the present disclosure.

That is, as shown in FIG. 3, the third-party device transmits the call request to the open platform, and the open platform performs verification on the third-party device. When the third-party device has the call permission, the parameter value corresponding to the target API function interface is obtained from the call request. Then, the software development kit SDK converts the parameter value corresponding to the target API function interface to generate the control signal conforming to the control protocol. The control signal is transmitted to the security gateway, and then a plurality of first vehicle components are communicated with through the security gateway.

Therefore, in the present disclosure, after the security gateway performs encryption, encryption is further performed by using the software development kit SDK, so that the outside developer cannot directly obtain an internal control protocol of the vehicle, for example, the control protocol B and control protocol A. Moreover, the outside developer only needs to assign a value to the API function interface, to control the vehicle component. Therefore, when there are a plurality of outside developers performing joint development at the same time, the plurality of outside developers may perform development control by calling a same API function interface, thereby greatly reducing difficulty of joint development.

Before the receiving a call request from a third-party device for a target API function interface of the open platform, the method further includes: extracting, from the call request, interface identifier information of the target API function interface that needs to be called; and identifying the target API function interface from all API function interfaces of the open platform according to the interface identifier information.

It should be understood that different API function interface identifiers represent different vehicle components. Before a vehicle component is controlled, interface identifier information of the target API function interface in the call request needs to be accurately identified to prevent misoperation.

After the transmitting the control signal to a security gateway through a first bus, the method further includes: receiving, by further using the open platform, vehicle state information transmitted by the security gateway, where the vehicle state information is obtained and sent by the vehicle to the security gateway after the first vehicle component executes the control signal; converting the vehicle state information to the parameter value corresponding to the target API function interface by using the software development kit; and transmitting the parameter value of the target API function to the third-party device through the target API function interface.

That is, after the third-party device controls the vehicle component, the open platform further transmits the state information of the vehicle component being controlled to the third party, to help the third party perform verification on or further control a control result.

The converting the vehicle state information to the parameter value corresponding to the target API function interface by using the software development kit includes: identifying the first vehicle component to which the vehicle state information belongs; and identifying the target API function interface from all the API function interfaces of the open platform according to the identified first vehicle component, and converting the vehicle state information to the parameter value corresponding to the target API function interface by using the software development kit.

It should be understood that the state information transmitted by the security gateway is state information conforming to the control protocol B. The software development kit SDK identifies the first vehicle component to which the state information belongs from the information, then, identifies the corresponding target API function interface from all the API function interfaces of the open platform according to the identified first vehicle component, and then, converts the state information to the parameter value corresponding to the target API function interface, to transmit the state information of the first vehicle component to the third-party device by using the parameter value of the target API function interface.

Before the converting the vehicle state information to the parameter value corresponding to the target API function interface by using the software development kit, the method further includes: comparing the identified first vehicle component with the first vehicle component in the control signal, and comparing the vehicle state information of the identified first vehicle component with the vehicle state information of the first vehicle component in the control signal, where the vehicle state information of the first vehicle component in the control signal represents a to-be-reached state after the first vehicle is controlled by using the control signal; and transmitting a prompt message to the third-party device if either the two first vehicle components or the two pieces of vehicle state information are inconsistent, where the prompt message includes the vehicle state information of the identified first vehicle component.

That is, the open platform is further configured to compare the state information, that is, the state information of the first vehicle component in the control signal is compared with the state information transmitted by the first vehicle component. In other words, a target state of external control is compared with a current state of a controlled component, so that a prompt message may be transmitted when a control target is different from a controlled component or a target control state is different from a controlled state, to help the third-party device perform a correction operation such as updating control information. The to-be-reached state after the first vehicle component is controlled is the target control state.

The first vehicle component identified from the state information is first compared with the first vehicle component in the control signal. If the identified first vehicle component is same as the first vehicle component in the control signal, the vehicle state information of the first vehicle component is further compared with the vehicle state information of the first vehicle component in the control signal. If either the two first vehicle components or the two pieces of vehicle state information are inconsistent, the prompt message is transmitted to the third-party device, to correct a state of the first vehicle component.

Before the receiving a call request from a third-party device for a target API function interface of the open platform, the method further includes: receiving the vehicle state information of the first vehicle component transmitted by the vehicle, and transmitting the vehicle state information of the first vehicle component to the third-party device through the target API function interface after converting the vehicle state information of the first vehicle component by using the software development kit.

That is, before the third-party device transmits the call request to the open platform, the current state of the first vehicle component may alternatively be received first, to help control the first vehicle component.

The open platform receives the vehicle state information of the first vehicle component transmitted by the vehicle, then, converts the vehicle state information of the first vehicle component by using the software development kit SDK, and further the vehicle state information to the third-party device through the target API function interface.

Therefore, according to the method in the present disclosure, the third-party device may obtain the vehicle state of the first vehicle component before control, and then, transmits the call request according to a current vehicle state of the first vehicle component, to control the first vehicle component. The first vehicle component changes the state according to the control signal, and then transmits the changed state to the third-party device through the open platform.

It should be understood that the third-party device may be an externally-connected intelligent driving module or may be integrated in a vehicle controller.

Asymmetric encryption may further be performed between the third-party device and the open platform, to further improve security of the control protocol of the vehicle.

Figure 4:
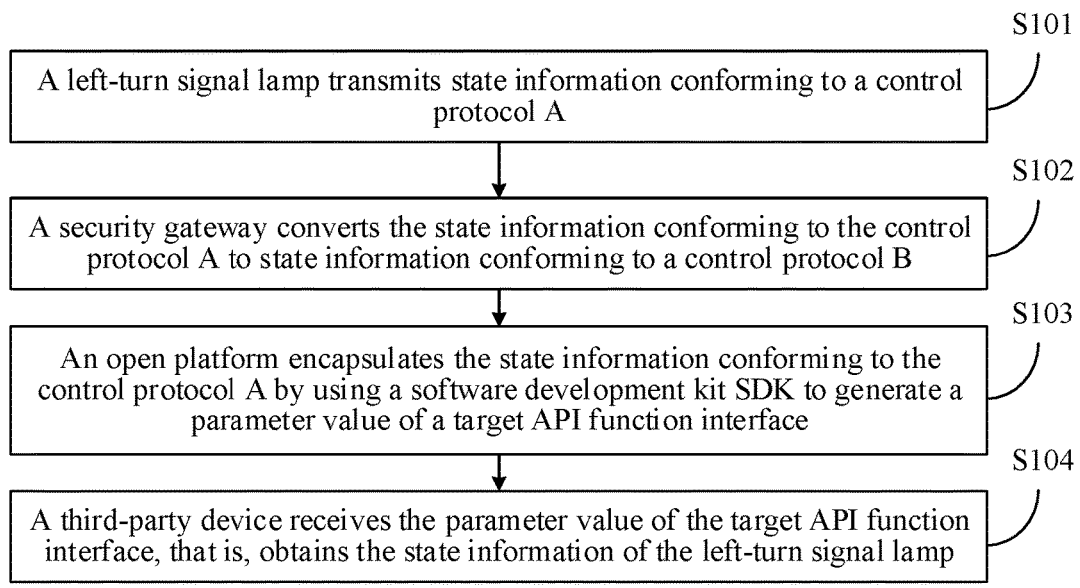
FIG. 4 is a flowchart of a vehicle security control method based on an open platform according to a specific embodiment of the present disclosure.

Using obtaining state information of a left-turn signal lamp as an example, as shown in FIG. 4, a control method in the present disclosure includes the following steps:

S101: The left-turn signal lamp transmits state information conforming to a control protocol A.

S102: A security gateway converts the state information conforming to the control protocol A to state information conforming to a control protocol B.

S103: An open platform encapsulates the state information conforming to the control protocol A by using a software development kit SDK to generate a parameter value of a target API function interface.

S104: A third-party device receives the parameter value of the target API function interface, that is, obtains the state information of the left-turn signal lamp.

Figure 5:
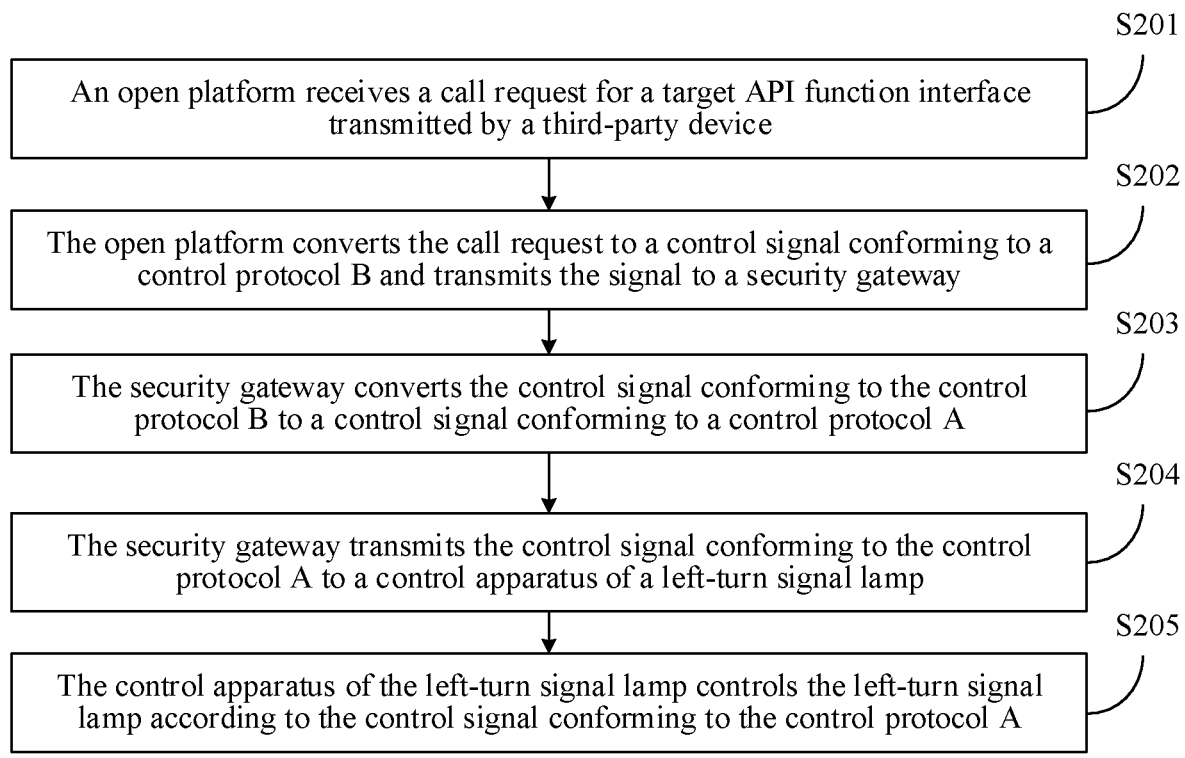
FIG. 5 is a flowchart of a vehicle security control method based on an open platform according to another specific embodiment of the present disclosure.

Using controlling a left-turn signal lamp as an example, as shown in FIG. 5, a control method in the present disclosure includes the following steps:

S201: An open platform receives a call request for a target API function interface transmitted by a third-party device.

S202: The open platform converts the call request to a control signal conforming to a control protocol B and transmits the signal to a security gateway.

S203: The security gateway converts the control signal conforming to the control protocol B to a control signal conforming to a control protocol A.

S204: The security gateway transmits the control signal conforming to the control protocol A to a control apparatus of the left-turn signal lamp.

S205: The control apparatus of the left-turn signal lamp controls the left-turn signal lamp according to the control signal conforming to the control protocol A.

Thus, according to the vehicle security control method based on an open platform provided in the present disclosure, a call request is first received from a third-party device for a target API function interface of the open platform, then, the call request is converted by using the software development kit to generate a control signal that meets a requirement of the control protocol and that is used for controlling a first component in a vehicle, and further, the control signal is transmitted to a security gateway through a first bus. Therefore, in the control method in the present disclosure, a control protocol can be converted by using a software development kit, to further keep a control protocol of a vehicle confidential and improve security performance of the control protocol of the vehicle. In addition, the software development kit can further provide an API function interface, to help an outside developer perform joint development.

Figure 6:
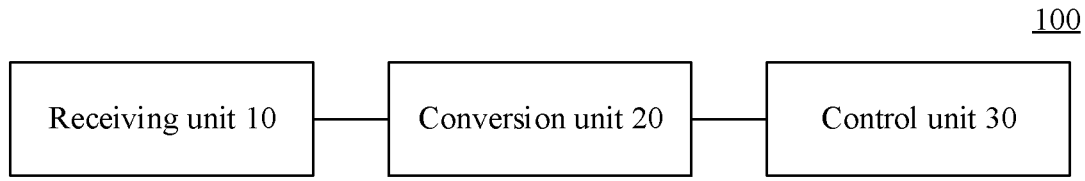
FIG. 6 is a schematic block diagram of a vehicle security control system based on an open platform according to the present disclosure.

FIG. 6 is a schematic block diagram of a vehicle security control system based on an open platform according to the present disclosure. The open platform includes a software development kit in which a control protocol is encapsulated, and the software development kit provides an API interface. As shown in FIG. 6, in the present disclosure, the vehicle security control system 100 based on an open platform includes: a receiving unit 10, a conversion unit 20 and a control unit 30.

The receiving unit 10 is configured to receive a call request from a third-party device for a target API function interface of the open platform. The conversion unit 20 is configured to convert the call request by using the software development kit to generate a control signal that meets a requirement of the control protocol and that is used for controlling a first vehicle component in a vehicle. The control unit 30 is configured to transmit the control signal to a security gateway through a first bus.

According to the vehicle security control system based on an open platform provided in the present disclosure, a receiving unit receives a call request from a third-party device for a target API function interface of the open platform, a conversion unit converts the call request by using the software development kit to generate a control signal that meets a requirement of the control protocol and that is used for controlling a first vehicle component in a vehicle, and a transmission unit transmits the control signal to a security gateway through a first bus. Therefore, the control system in the present disclosure can convert a control protocol by using a software development kit, to further keep a control protocol of a vehicle confidential and improve security performance of the control protocol of the vehicle. In addition, the software development kit can further provide an API function interface, to help an outside developer perform joint development.

Figure 7:
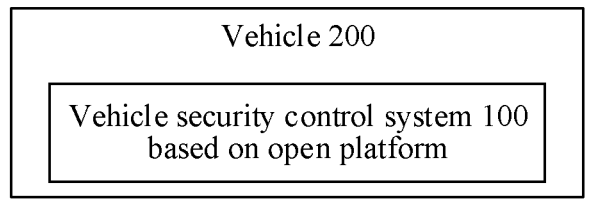
FIG. 7 is a schematic block diagram of a vehicle according to an embodiment of the present disclosure.

The present disclosure further provides a vehicle. As shown in FIG. 7, the vehicle 200 further provided in the present disclosure includes the vehicle security system 100 based on an open platform.

According to the vehicle provided in the present disclosure, the vehicle security system based on an open platform can further keep a control protocol of a vehicle confidential and improve security performance of the control protocol of the vehicle. In addition, the software development kit can further provide an API function interface, to help an outside developer perform joint development.

In the descriptions of the present disclosure, terms "first" and "second" are only used for description and cannot be understood as indicating or implying relative importance or implying a quantity of the indicated technical features. Therefore, the features defined with "first" and "second" may include at least one of the features explicitly or implicitly. In the descriptions of the present disclosure, "a plurality of" means at least two, such as two and three unless it is specifically defined otherwise.

In the present disclosure, unless otherwise explicitly specified and defined, terms such as "mounted", "connected", "connection", "fixed" should be understood in broad sense, for example, the connection may be a fixed connection, a detachable connection, or an integral connection; or the connection may be a mechanical connection or an electrical connection; or the connection may be a direct connection, an indirect connection through an intermediary, or internal communication between two elements or a mutual action relationship between two elements, unless otherwise specified explicitly. Persons of ordinary skill in the art may understand the specific meanings of the foregoing terms in the present disclosure according to specific situations.

Although the embodiments of the present disclosure are shown and described above, it may be understood that, the above embodiments are exemplary, and cannot be construed as a limitation to the present disclosure. A person of ordinary skill in the art may make changes, modifications, replacement, and variations to the above embodiments within the scope of the present disclosure.

What is claimed is:

1. A vehicle security control method, comprising:
   receiving a call request from a third-party device for a target API function interface of an open platform, wherein the open platform comprises a software development kit in which a control protocol is encapsulated, and the software development kit provides an API function interface;
   converting the call request by using the software development kit to generate a control signal that meets a requirement of the control protocol and that is used for controlling a first vehicle component in a vehicle; and transmitting the control signal to a security gateway through a first bus, to enable the security gateway to perform protocol conversion on the control signal, and transmitting the control signal to an in-vehicle network to control the first vehicle component in the vehicle, wherein before the receiving a call request from a third-party device for a target API function interface of the open platform, the method further comprises:

receiving vehicle state information of the first vehicle component transmitted by the vehicle, and transmitting the vehicle state information of the first vehicle component to the third-party device through the target API function interface after converting the vehicle state information of the first vehicle component by using the software development kit.

2. The method according to claim 1, wherein the converting the call request by using the software development kit to generate a control signal that meets a requirement of the control protocol and that is used for controlling a first vehicle component in a vehicle comprises:

obtaining a parameter value corresponding to the target API function interface from the call request; and converting, according to the parameter value corresponding to the target API function interface, the parameter value by using the software development kit to generate the control signal conforming to the control protocol.

3. The method according to claim 2, wherein the obtaining a parameter value corresponding to the target API function interface from the call request comprises:

verifying, according to device information of the third-party device in the call request, whether the third-party device has a call permission; and allowing, if the third-party device has the call permission, the third-party device to obtain the parameter value corresponding to the target API function interface from the call request.

4. The method according to claim 1, wherein before the receiving a call request from a third-party device for a target API function interface of the open platform, the method further comprises:

extracting, from the call request, interface identifier information of the target API function interface that needs to be called; and identifying the target API function interface from all API function interfaces of the open platform according to the interface identifier information.

5. The method according to claim 1, wherein after the transmitting the control signal to a security gateway through a first bus, the method further comprises:

receiving, by further using the open platform, the vehicle state information transmitted by the security gateway, where the vehicle state information is obtained and sent by the vehicle to the security gateway after the first vehicle component executes the control signal;

converting the vehicle state information to the parameter value corresponding to the target API function interface by using the software development kit; and transmitting the parameter value of the target API function to the third-party device through the target API function interface.

6. The method according to claim 5, wherein the converting the vehicle state information to the parameter value corresponding to the target API function interface by using the software development kit comprises:

identifying the first vehicle component to which the vehicle state information belongs; and identifying the target API function interface from all the API function interfaces of the open platform according to the identified first vehicle component, and converting the vehicle state information to the parameter value corresponding to the target API function interface by using the software development kit.

7. The method according to claim 5, wherein before the converting the vehicle state information to the parameter value corresponding to the target API function interface by using the software development kit, the method further comprises:

comparing the identified first vehicle component with the first vehicle component in the control signal, and comparing the vehicle state information of the identified first vehicle component with the vehicle state information of the first vehicle component in the control signal, wherein the vehicle state information of the first vehicle component in the control signal represents a to-be-reached state after the first vehicle is controlled by using the control signal; and transmitting a prompt message to the third-party device if either the two first vehicle components or the two pieces of vehicle state information are inconsistent, wherein the prompt message comprises the vehicle state information of the identified first vehicle component.

8. A non-transitory computer-readable storage medium storing computer-executable instructions for, when executed by one or more processors, performing a vehicle security control method, the method comprising:

receiving a call request from a third-party device for a target API function interface of an open platform, wherein the open platform comprises a software development kit in which a control protocol is encapsulated, and the software development kit provides an API function interface;

converting the call request by using the software development kit to generate a control signal that meets a requirement of the control protocol and that is used for controlling a first vehicle component in a vehicle; and transmitting the control signal to a security gateway through a first bus, to enable the security gateway to perform protocol conversion on the control signal, and transmitting the control signal to an in-vehicle network to control the first vehicle component in the vehicle, wherein before the receiving a call request from a third-party device for a target API function interface of the open platform, the method further comprises:

receiving vehicle state information of the first vehicle component transmitted by the vehicle, and transmitting the vehicle state information of the first vehicle component to the third-party device through the target API function interface after converting the vehicle state information of the first vehicle component by using the software development kit.

9. The non-transitory computer-readable storage medium according to claim 8, wherein the converting the call request by using the software development kit to generate a control signal that meets a requirement of the control protocol and that is used for controlling a first vehicle component in a vehicle comprises:

obtaining a parameter value corresponding to the target API function interface from the call request; and converting, according to the parameter value corresponding to the target API function interface, the parameter value by using the software development kit to generate the control signal conforming to the control protocol.

10. The non-transitory computer-readable storage medium according to claim 9, wherein the obtaining a parameter value corresponding to the target API function interface from the call request comprises:
  verifying, according to device information of the third-party device in the call request, whether the third-party device has a call permission; and
  allowing, if the third-party device has the call permission, the third-party device to obtain the parameter value corresponding to the target API function interface from the call request.

11. The non-transitory computer-readable storage medium according to claim 8, wherein before the receiving a call request from a third-party device for a target API function interface of the open platform, the method further comprises:
  extracting, from the call request, interface identifier information of the target API function interface that needs to be called; and
  identifying the target API function interface from all API function interfaces of the open platform according to the interface identifier information.

12. The non-transitory computer-readable storage medium according to claim 8, wherein after the transmitting the control signal to a security gateway through a first bus, the method further comprises:
  receiving, by further using the open platform, the vehicle state information transmitted by the security gateway, where the vehicle state information is obtained and sent by the vehicle to the security gateway after the first vehicle component executes the control signal;
  converting the vehicle state information to the parameter value corresponding to the target API function interface by using the software development kit; and
  transmitting the parameter value of the target API function to the third-party device through the target API function interface.

13. The non-transitory computer-readable storage medium according to claim 12, wherein the converting the vehicle state information to the parameter value corresponding to the target API function interface by using the software development kit comprises:
  identifying the first vehicle component to which the vehicle state information belongs; and
  identifying the target API function interface from all the API function interfaces of the open platform according to the identified first vehicle component, and converting the vehicle state information to the parameter value corresponding to the target API function interface by using the software development kit.

14. The non-transitory computer-readable storage medium according to claim 12, wherein before the converting the vehicle state information to the parameter value corresponding to the target API function interface by using the software development kit, the method further comprises:
  comparing the identified first vehicle component with the first vehicle component in the control signal, and comparing the vehicle state information of the identified first vehicle component with the vehicle state information of the first vehicle component in the control signal, wherein the vehicle state information of the first vehicle component in the control signal represents a to-be-reached state after the first vehicle is controlled by using the control signal; and
  transmitting a prompt message to the third-party device if either the two first vehicle components or the two pieces of vehicle state information are inconsistent, wherein the prompt message comprises the vehicle state information of the identified first vehicle component.

* * * * *